No. 864,141. PATENTED AUG. 20, 1907.
T. F. SCOTT.
COMPRESSED AIR CUSHION MECHANISM FOR AUTOMOBILES.
APPLICATION FILED JUNE 14, 1906.
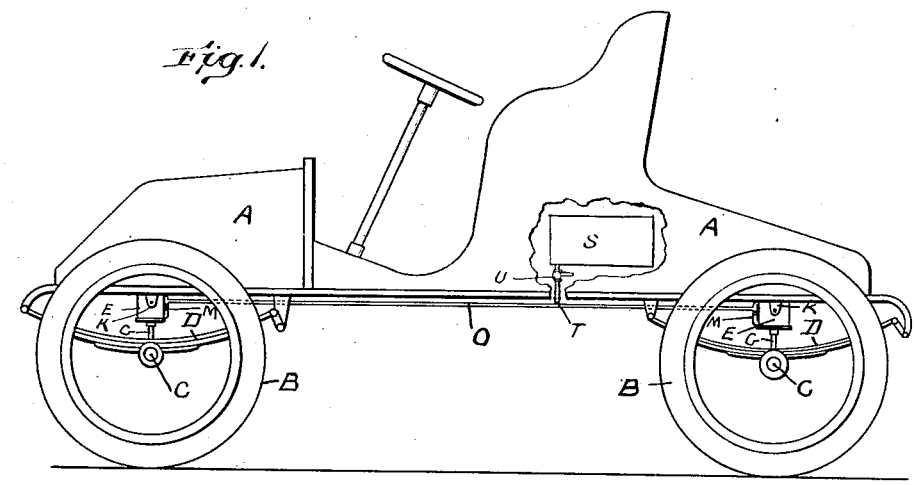
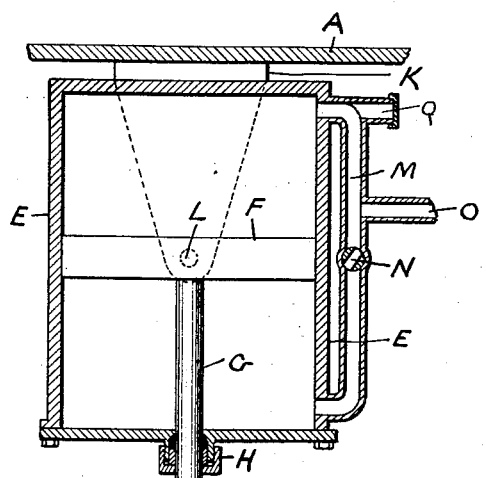
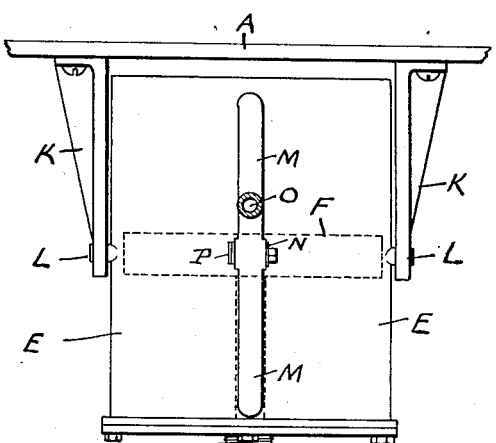
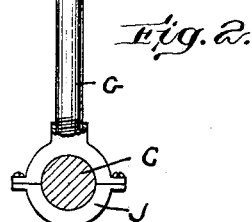
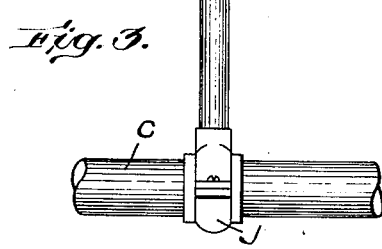
Witnesses:
Charles R. Brown
Bumner B. Robinson
Inventor:
Thomas F. Scott
by Albert W. Brown
Attorney.

UNITED STATES PATENT OFFICE.

THOMAS F. SCOTT, OF EVERETT, MASSACHUSETTS.

COMPRESSED-AIR-CUSHION MECHANISM FOR AUTOMOBILES.

No. 864,141.   Specification of Letters Patent.   Patented Aug. 20, 1907.

Application filed June 14, 1906. Serial No. 321,772.

*To all whom it may concern:*

Be it known that I, THOMAS F. SCOTT, a citizen of the United States, residing at the city of Everett, in the county of Middlesex and State of Massachusetts, have invented a new and useful Improved Compressed-Air-Cushion Mechanism for Automobiles, &c., of which the following is a specification.

This invention relates to a mechanism for attachment to and connection with the body and a wheel-axle of automobiles, carriages, or other road vehicles, for the purpose of substantially and practically overcoming, or offsetting sudden jolts, jars or bumpings, or such like of the vehicle body and an axle thereof in the run of the vehicle, and more especially such as are due to uneven and rough roadways, and so thereby to insure evenness and ease of motion to the vehicle body, its springs and all other parts of its running-gear or appurtenances.

The apparatus or mechanism of this invention, for the purpose above stated, consists, in substance, of a piston-cylinder which, preferably, is attached to or anchored on the body of the vehicle, but may be attached to or anchored on a wheel-axle thereof, but in either case, is preferably, vertically arranged and capable of swinging or oscillating in a corresponding plane; a piston-head arranged to travel forward and backward in said cylinder, from end to end thereof; a piston-rod, at one end axially fixed to one end of said piston and passing through a suitable stuffing-box of the corresponding head of said piston-cylinder, and at its other end connected or anchored either to a wheel-axle or to the body of the vehicle, according as the piston-cylinder, as before stated, is anchored or connected either to the body, or to the wheel-axle, but in either case so as to be capable of swinging thereon in and through a plane corresponding to the swing of the piston-cylinder; a by-way or passage connecting the opposite ends of the piston-cylinder, and a regulating-valve in said by-way, and all and severally adapted for the use of compressed air, and for equalizing the pressure thereof at and on the opposite sides of the piston-head, and also so as to offset, or overcome, or relieve, through the movement of the piston-head in the piston-cylinder, and by the then resisting action of the compressed air at the opposite ends of the piston-cylinder and on the opposite sides of the piston-head, the sudden jolts, jumpings, bumpings, or jars or shocks on and of the vehicle-body, its wheel-axles, and its springs as the vehicle passes over uneven, or rough surfaces, or depressions and elevations of the roadway; and also to secure a gradual and controlled return of all the parts of the apparatus to their normal positions after an action thereof, such as aforesaid, and all without strain or wrenching of any of the parts of said apparatus, or their connections, or of the wheel-axles or vehicle-body, and with no disagreeable jolting, or throwing, or bouncing of the persons occupying the vehicle.

In the accompanying drawings, forming a part of this specification, this invention is illustrated in connection with the body and the wheel-axles of an automobile, which otherwise is constructed and adapted for operation and use in any of the well known modes, or otherwise suitably.

Figure 1 is a side view of the body of an automobile and of an apparatus of this invention applied between the body and each of its wheel-axles, and showing a connection of the two apparatuses, all as will hereinafter appear. Fig. 2 is an enlarged vertical sectional view of the piston-cylinder and a wheel-axle and showing the piston-head and its rod in side elevation. Fig. 3 is an elevation of the piston-cylinder, piston-rod and partially along the length of a wheel-axle, which is shown as broken off at opposite sides of the piston-rod connection therewith.

In the drawings, A represents the body of an automobile, and B, B its forward and rear wheels at one of its sides.

C, C are the wheel-axles, and D, D are the ordinary elliptical springs between the wheel-axles and the under side of the body A, all as well known, or otherwise suitably, and therefore needing no more particular description herein, or illustration in the drawings.

E is a piston-cylinder having its opposite ends or heads closed.

F is a piston-head arranged to move forward and backward in the cylinder E, and G is a piston-rod, at one end, centrally and axially attached to one side of the piston-head and extending therefrom through a suitable stuffing-box H at the corresponding head of the piston-cylinder, and, at the other end, hung or anchored, by its divided collar J, having its parts suitably fastened together, on a wheel-axle, and all so as to be capable of swinging in and through a vertical plane on such axle.

K, K are parallel vertical brackets attached to or anchored on the underside of the vehicle-body, and dependent therefrom. Between these brackets the piston-cylinder E is located, and by trunnion-pins L, L, on its opposite sides, it is hung in suitable bearings at the lower ends of said brackets, and all, preferably, so that normally the piston-cylinder and piston-rod will be axially in a vertical plane at right angles to the under side of the vehicle-body and coincident with the vertical plane through and along the length of the axial line of a wheel-axle.

M is a by-way or passage at and along one side of the piston-cylinder, and making communication between the opposite ends of the cylinder.

N is a regulating valve or cock in the by-way M, located between its opposite ends. This valve is provided exteriorly with a suitable handle P for convenience, as well known, in operating it to open and close it relative to the by-way M and thereby to regulate the capacity of said by-way for the flow of compressed air through it or, in other words, from one to the other end of the piston-cylinder.

A piston-cylinder and the other several parts connected therewith, as above described, are similarly arranged or anchored on and to the vehicle-body and connected or anchored to the wheel-axles at the opposite ends of the body, and they are so shown, Fig. 1, and the by-ways or passages M of the cylinders are shown as connected together by a common pipe O, running under and lengthwise of the vehicle-body, and which should be such in its length, as for instance, in part of rubber tubing, as to yield or bend without strain on its jointings with the cylinder, as it adjusts itself to the varying positions of inclination into which either one, or the other, or both of the piston-cylinders and piston-rods may be placed, by the jolting or jumping or bouncing movement of either the vehicle-body, or the wheel-axles, or of the springs, or of them all combined.

The piston-cylinder is to be charged, as well known, and in any suitable manner, with compressed air and for this purpose the by-way M, or the cylinder itself, may be provided with a port or opening, as for instance, at Q, in the by-way, suitably adapted therefor, and to be suitably closed and opened for such purpose.

The degree of pressure of the compressed air in a piston-cylinder is to be regulated and made most suitable for the desired action of the mechanism of this invention, and this degree of compression, as is obvious, will vary according to the contingencies of the vehicle to which said mechanism is applied, as for instance, according to the resiliency, or stiffness of the springs supporting the body on a wheel-axle, or other obvious reasons.

Mechanisms charged with compressed air and anchored or connected to a vehicle-body and its wheel-axles, all substantially as has been described, in cases of rough and uneven road-ways and of depressions and elevations thereof, and as the vehicle passes thereover, serves by a then further compression or cushioning of the air at one end of the piston-cylinder in the upward movement of the piston-head and by the same compression or cushioning of the air at the other end of the piston-cylinder in the following downward movement of the piston-head, or vice versa, to automatically control the compression and the rebound of the body-springs, and the upward and downward movement of the vehicle-body consequent thereon, and all without interference with the normal resiliency of the springs, and in this manner, the sudden bouncings, jolts, jars, or throwing of the vehicle and wheels in such cases are substantially counteracted, or obviated, or overcome and regulated and controlled to a degree and extent sufficient to relieve such movements of all their disagreeable and uncomfortable effects upon the persons riding in, and the liability therefrom of damaging the running-gear and other parts of the vehicle.

Each of the mechanisms described secures a perfect double acting compressed air-cushion as to the movement of the piston-head in the piston-cylinder; again t secures a perfect transfer of pressure from one side of the piston-head to the other, and at any and all times and under any and all circumstances, by and through the by-way connecting the two ends of the piston-cylinder, and which is adapted to be regulated as has been explained; and again the by-way secures a gradual easing off of the pressure in its excess, if any, at one end of the piston-cylinder as compared with its pressure at the other end thereof, and so enables, at any and all times and under any and all circumstances, a perfect and never failing air-cushion on both sides of the piston-head to be maintained, and all without in the least degree, or to the least extent interfering with, or affecting the normal resiliency or other normal action of the ordinary vehicle-springs. In other words, the mechanism and compressed air pressure employed therewith, substantially as has been described, in combination with the wheel-axles, the body and supporting springs of a vehicle, such for instance, as an automobile, practically obviates all possibility or liability of the bumping, or jumping, or jolting of the vehicle-body and wheel-axles and springs and not only as to each, of itself, but also severally as to and in conjunction with each other, and no matter how rough, or uneven, or how otherwise different from being smooth and even, the surface of the roadway may be, over which the vehicle is traveling.

It will be observed in the shown and described arrangement of the mechanism of this invention and its combination with the vehicle-body, its wheel-axles, and springs, that the superficial area of the piston-head is greater at one than at the other of its sides or faces and to an amount equal to the superficial area of the piston-rod along the plane of a cross section thereof at its juncture with the piston-head; and that also normally the compressed air-pressure is substantially and practically equal at the opposite ends of the piston-cylinder, or in other words, at the opposite sides or faces of the piston-head and is so maintained because of the communication provided between the opposite ends of the piston-cylinder through the by-way or passage M; and also that when by a sudden throwing or bolting or jumping of the wheel-axles or of the vehicle-body, or of both, the piston-head by its face or side of greater superficial area is forced against the pressure of the compressed air at that end of the piston-cylinder, which, as is plain, necessarily increases that pressure, while, at the same time, the compressed air-pressure at the opposite side or face of the piston-head is reducing, or is being reduced, such unequalizing of the air-pressures on the opposite sides of the piston-head begins at once to be and is corrected, and the pressure practically equalized by means of and through the said by-way or passage M, and thus the desired cushioning of the piston-head on its return movement is most efficiently and perfectly insured, and the above is true as to an equalizing of the opposite end pressure in the piston-cylinder on a movement of the piston-head in a direction opposite to that above described.

In Fig. 1, there is shown as located on or carried by the body of the vehicle, a closed air-receptacle S connected by a pipe T with the pipe O that connects the by-ways or passages M of the two piston-cylinders with each other. This pipe T is provided at any suitable point with a relief or reducing valve U of any of the usual and ordinary and well known or other suitable constructions and arrangements and therefore needing no particular description herein, or particular illustration in the drawings. Obviously with these parts properly adapted any extraordinary or undue air compression in either one or the other or both of the piston-cylinders and at any stage of the operation of their respective piston-heads on the compressed air confined therein, can plainly be taken care of, if it is so required or necessary, and all proper and desired relief thereof thus automatically secured.

Either the closed air-receptacle S may be hung by trunnion-pins the same as described for the piston-cylinders, or the pipeconnection T may be suitably adapted, as for instance, made in part of rubber tubing, as well known, or both together thus adapted so as to be capable of adjustment to the varying positions of the piston-cylinders, either one or both, and thus avoid straining of the same.

Having thus described my invention, what I claim and desire to secure by Letters Patent is,

1. In an automobile, or other road vehicle, the combination with the body and a wheel-axle, of a vertical piston-cylinder with closed heads, vertical standards fixed to the underside of the body, means suspending the piston-cylinder on and between said standards for it to swing in a longitudinal vertical plane on the body, a piston-head in said cylinder, a piston-rod extending from the lower side of the piston-head to and through a stuffing-box of the lower closed end of the piston-cylinder, means hanging the piston-rod on the wheel-axle for it to turn in a longitudinal vertical plane thereon, a by-way or passage connecting the opposite end-portions of the piston-cylinder, a regulating valve in said by-way, an opening at which to charge the piston-cylinder, and means to open and close said opening, all for operation, substantially as described for the purposes specified.

2. In an automobile, or other road vehicle, the combination with the body and the wheel-axles, of vertical piston-cylinders each with closed heads, vertical standards fixed to the underside of the body, means suspending each piston-cylinder on and between separate pairs of said standards for each to swing in a longitudinal vertical plane of the body, a piston-head in each of said cylinders, a piston-rod extending from the lower side of each piston-head and through a stuffing-box of the lower closed end of its piston-cylinder, means hanging each piston-rod on a wheel axle for each to turn in a longitudinal vertical plane thereon, a by-way or passage connecting the opposite end-portions of each piston-cylinder, a regulating-valve in each of said by-ways, an opening at which to charge the piston-cylinder, means to open and close said opening, and a pipe connecting said two by-ways and capable of self-adjustment to the swing of the piston-cylinders on their said supporting standards, all for operation, substantially as described, for the purposes specified.

3. In an automobile, or other road vehicle, the combination with the body and a wheel-axle, of a vertical piston-cylinder with closed heads, vertical standards fixed to the under side of the body, means suspending the piston-cylinder on and between said standards for it to swing in a longitudinal vertical plane on the body, a piston-head in said cylinder, a piston-rod extending from the lower side of the piston-head to and through a stuffing-box of the lower closed end of the piston-cylinder, means hanging the piston-rod on the wheel-axle for it to turn in a longitudinal vertical plane thereon, a by-way or passage connecting the opposite end-portions of the piston-cylinder, a regulating valve in said by-way, an opening at which to charge the piston-cylinder, means to open and close said opening, a pipe connected with said by-way and capable of self adjustment to the swing of the piston-cylinder on its said supporting standards, a closed air-reservoir, carried by the body and connected with said pipe, and a relief-valve in said pipe, all for operation, substantially as described for the purposes specified.

4. In an automobile, or other road vehicle, the combination with the body and a wheel-axle, of a vertical piston-cylinder with closed heads, vertical standards fixed to the underside of the body, means consisting of trunnion-pins and bearings therefor on the piston-cylinder and said standards, suspending the piston-cylinder on and between said standards for it to swing in a longitudinal vertical plane on the body, a piston-head in said cylinder, a piston-rod extending from the lower side of the piston-head to and through a stuffing-box of the lower closed end of the piston-cylinder, means hanging the piston-rod on the wheel-axle for it to turn in a longitudinal vertical plane thereon, a by-way or passage connecting the opposite end-portions of the piston-cylinder, a regulating valve in said by-way, an opening at which to charge the piston-cylinder, and means to open and close said opening, all for operation, substantially as described for the purposes specified.

In witness whereof, I have hereunto set my hand in the presence of two subscribing witnesses.

THOS. F. SCOTT.

Witnesses:
ALBERT W. BROWN.
CHARLES R. BROWN.